US008432167B2

(12) United States Patent
Reiderman

(10) Patent No.: US 8,432,167 B2
(45) Date of Patent: *Apr. 30, 2013

(54) METHOD AND APPARATUS OF USING MAGNETIC MATERIAL WITH RESIDUAL MAGNETIZATION IN TRANSIENT ELECTROMAGNETIC MEASUREMENT

(75) Inventor: Arcady Reiderman, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 929 days.

This patent is subject to a terminal disclaimer.

(21) Appl. No.: 11/037,488

(22) Filed: Jan. 18, 2005

(65) Prior Publication Data

US 2005/0189945 A1  Sep. 1, 2005

Related U.S. Application Data

(60) Provisional application No. 60/542,932, filed on Feb. 9, 2004.

(51) Int. Cl.
*G01V 3/18* (2006.01)
(52) U.S. Cl.
USPC .......................................... 324/339; 324/336
(58) Field of Classification Search .................. 324/339, 324/222, 368
See application file for complete search history.

(56) References Cited

U.S. PATENT DOCUMENTS

| | | | | |
|---|---|---|---|---|
| RE24,359 E * | 9/1957 | Rajchman et al. | ............. | 324/211 |
| 2,992,389 A * | 7/1961 | Gondouin | ...................... | 324/342 |
| 3,453,530 A * | 7/1969 | Attali | ............................ | 324/339 |
| 3,731,752 A * | 5/1973 | Schad | ............................ | 175/45 |
| 4,041,954 A * | 8/1977 | Ohara | ........................... | 600/510 |
| 4,205,288 A * | 5/1980 | Lin et al. | ........................... | 336/5 |
| 4,409,846 A * | 10/1983 | Ueno | ........................... | 73/861.17 |
| 4,465,140 A * | 8/1984 | Hoehn, Jr. | ...................... | 166/381 |
| 4,736,634 A * | 4/1988 | Amata | ......................... | 73/861.12 |
| 5,086,554 A * | 2/1992 | Murata et al. | ................... | 29/605 |
| 6,791,331 B2 * | 9/2004 | Conti | ............................. | 324/339 |
| 7,046,009 B2 * | 5/2006 | Itskovich | ....................... | 324/338 |
| 2003/0076107 A1 * | 4/2003 | Fanini et al. | .................. | 324/339 |
| 2003/0129763 A1 * | 7/2003 | Chamberlain et al. | ......... | 324/339 |
| 2004/0183538 A1 * | 9/2004 | Hanstein et al. | ............... | 324/339 |
| 2005/0030021 A1 * | 2/2005 | Prammer et al. | .............. | 324/303 |
| 2008/0018334 A1 * | 1/2008 | Reiderman | ..................... | 324/346 |

OTHER PUBLICATIONS

Robert C. O'Handley, Modern Magnetic Materials: Principles and Applications, John Wiley & Sons, Inc., New York, pp. 29-47, 2000.
"Permeability, Mumetal® and Alloys," Dowloaded from: http://www.magnetic-shield.com/faq/pma.html ; Jan. 31, 2011.
"Remanance," "magnetism." Encyclopaedia Britannica. Encyclopaedia Britannica Online. Encyclopaedia Britannica, 2011. Web. Jan. 31, 2011. <http://www.britannica.com/EBchecked/topic/357334/magnetism>.

* cited by examiner

*Primary Examiner* — Patrick Assouad
*Assistant Examiner* — David M. Schindler
(74) *Attorney, Agent, or Firm* — Mossman Kumar & Tyler PC

(57) ABSTRACT

A transmitter antenna assembly for transient electromagnetic well logging instrument comprises an antenna coil coupled with a current source and a magnetic core having residual magnetization. Switching current in the antenna coil results in magnetization reversal in the magnetic core and change in magnetic dipole moment of the antenna. After the magnetization reversal is complete the current is removed and the new vector of magnetic dipole of the antenna maintains constant (steady-state phase of the antenna dipole) due to magnetic hysteresis of magnetic material employed for the magnetic core. No power expenditure during the steady-state phase of the magnetic dipole facilitates highly effective generation and fast switching of a large magnetic dipole. The magnetic core also serves as a shield between the antenna coil and any conductive part of the antenna assembly. Embodiments suitable for measurement-while-drilling or measurements through casing make use of residual magnetization of magnetic drill collar or magnetic casing respectively.

22 Claims, 12 Drawing Sheets

METHOD AND APPARATUS OF USING MAGNETIC MATERIAL WITH RESIDUAL MAGNETIZATION IN TRANSIENT ELECTROMAGNETIC MEASUREMENT

CROSS-REFERENCE TO RELATED APPLICATIONS

This application is related to a provisional patent application claiming the benefit under 35 USC 119(e). The provisional patent application number is 60/542,932; filing date is Feb. 9, 2004.

STATEMENT REGARDING FEDERALLY SPONSORED RESEARCH OR DEVELOPMENT

Not applicable.

BACKGROUND OF THE INVENTION

1. Field of the Invention

The invention relates generally to the field of electromagnetic induction well logging. More particularly, the invention relates to method and structure for generating and rapidly reversing a large magnetic dipole moment. The reversible magnetic dipole is used to generate transient induction signal in Earth's formations in order to study electromagnetic transient response related to the electrical properties of the Earth's formations surrounding the wellbore.

2. Background Art

Electromagnetic induction well logging is known in the art for determining electrical properties of earth formations penetrated by a wellbore. An instrument for electromagnetic induction logging is lowered into the well bore and typically includes a transmitter induction antenna connected to a source of current. The current source driving the antenna could be a sinusoidal current. In this case the alternating current (AC) measurements in frequency domain are performed. Alternatively the current source could be a generator of rectangular pulses with sharp trailing edge thus facilitating so called transient electromagnetic measurements in time domain. The induction instrument also includes at least one induction receiver antenna axially spaced apart from the transmitter antenna. An induction antenna, used for both transmitting and receiving signals in an induction well logging instrument can be thought of as a magnetic dipole. In a simplest case of a current loop or coil the direction of the magnetic dipole moment is perpendicular to the plane of the turns of wire making the coil or the loop.

An electromagnetic induction well logging instrument can be implemented as a "wireline" instrument or as a part of a drilling tool assembly: a measurement while drilling" (MWD) instrument. A wireline instrument is lowered into the wellbore and removed from there by means of an armored electrical cable. The parts of the instrument housing that cover the transmitter and the receiver antennas are made from electrically non-conductive and non-magnetic material so that these parts do not interfere with the magnetic field generated by transmitter antenna and do not mask the response from the earth formations coming to the receiver antenna. An MWD logging instrument has high strength metal collar that to a substantial degree affects the signal generated by transmitter antenna and the received signals. See, for example, U.S. Pat. No. 5,138,263 issued to Towle et al. A conductive part, for example, high strength metal rod could be also a part of a wireline instrument to facilitate using an additional logging instrument coupled bellow the induction logging instrument.

In order to increase depth of investigation of an induction logging instrument it is required for the transmitter antenna to generate strongest magnetic dipole moment possible. For this purpose the induction sensors often include a magnetically permeable material, such as ferrite. See, for example, previously cited U.S. Pat. No. 5,138,263 issued to Towle et al., as well as U.S. Pat. No. 6,452,388 issued to Reiderman, et al. and U.S. Pat. No. 5,757,186 issued to Taicher, et al. The effect of magnetically permeable material is the increase the dipole magnetic moment of the antenna per unit current in the antenna coil due to magnetization of the magnetic material. Yet another effect of a high permeability magnetic material is to concentrate magnetic flux, thus substantially preventing exposing conductive parts of the antenna assembly to alternating magnetic field of the antenna coil, which would otherwise produce undesired eddy currents in the conductive parts.

Increasing magnetic dipole moment per unit current by using high permeability magnetic material or by increasing the number of turns in the antenna coil typically results in higher inductance of the antenna. As a consequence, the voltage developed across the antenna terminals could be inappropriately high for down-hole application. In frequency domain induction measurements a narrowband excitation with different frequencies can typically employed to get response of the surrounding earth formations from different spatial areas of the formations. A larger number of turns and correspondingly higher inductance can be typically used for lower frequency band to increase magnetic dipole moment for energizing deeper areas. In this case a dissipative power loss in the antenna coil limits the magnetic dipole moment of the antenna.

U.S. Pat. No. 5,955,884 issued to Payton et al. describes a transient type of electromagnetic well logging instrument. The instrument has a transmitter antenna coupled to a source of current having a waveform adapted to induce transient electromagnetic induction effect in the earth formation surrounding the wellbore. When the transmitter current in transient induction instrument is switched abruptly, the signals appearing at a receiver is caused by the induction currents in the formation by, the currents caused the transmitted signal. A remarkable advantage of transient electromagnetic instrument is an ability to separate in time the response of different spatial areas. In order to facilitate measurement of the formation response from nearby to deep areas the transmitted signal should be substantially broadband. In this case the transmitter antenna should meet the requirements of a large dipole moment and an ability to be rapidly switched.

An attempt to implement induction measurement through casing of cased wells is presented in U.S. Pat. No. 5,426,367 issued to Martin et al. Generating magnetic flux in the surrounding earth formations is achieved by saturating a relatively small part of the casing thus making "magnetic window" to the magnetic flux generated by coil inside casing. The method is not suitable to generating strong magnetic dipoles to facilitate deep investigation.

Thus known in the art instruments do not give any satisfactory solution that would facilitate broad spatial range of excitations in the transient induction method.

Therefore it is one objective of the present invention to provide a solution for this problem. It is another objective is to make it work in presence of conductive support or conductive collar in case of MWD application. Yet another objective of the present invention is to provide a solution for the problem of induction transient logging of cased wells.

BRIEF SUMMARY OF THE INVENTION

One aspect of the present invention is a transmitter antenna assembly for transient electromagnetic well logging instrument that comprises an antenna coil coupled with a current source and a magnetic core having residual magnetization. Switching current in the antenna coil results in magnetization reversal in the magnetic core and change in magnetic dipole moment of the antenna. After the magnetization reversal is complete the current is removed and the new vector of magnetic dipole of the antenna maintains constant (steady-state phase of the antenna dipole) due to substantial magnetic hysteresis and residual magnetization of magnetic material employed for the magnetic core. No power expenditure during the steady-state phase of the magnetic dipole facilitates highly effective generation and fast switching of a large magnetic dipole. The magnetic core also serves as a shield between the antenna coil and any conductive part of the antenna assembly.

Another aspect of the present invention is a method of using magnetization reversal in the magnetic drill collar. Switching polarity of the residual magnetization of the drill collar generates transient processes in the earth formations. High dipole moment of the magnetized collar facilitates deep-looking electromagnetic induction transient measurements.

Yet another aspect of the present invention is a method of generating transient signal in the earth formation in through-casing induction logging of cased wells. A fragment of the casing is magnetized by the magnetic field of the antenna, the antenna is driven by a pulsed current. When the antenna current is switched off the residual magnetization of the fragment facilitates generating a substantial magnetic field outside the casing. Switching polarity of the residual magnetization of the fragment generates transient process in the earth formations. High dipole moment of the magnetized fragment of the casing facilitates deep-looking electromagnetic induction transient measurements.

Other aspects and advantages of the invention will be apparent from the following description and the appended claims.

DETAILED DESCRIPTION OF THE MENTION

In most general terms, the invention provides a magnetic dipole antenna having large and rapidly reversible magnetic dipole in order to generate transient induction signal in earth formations.

Figure 1:
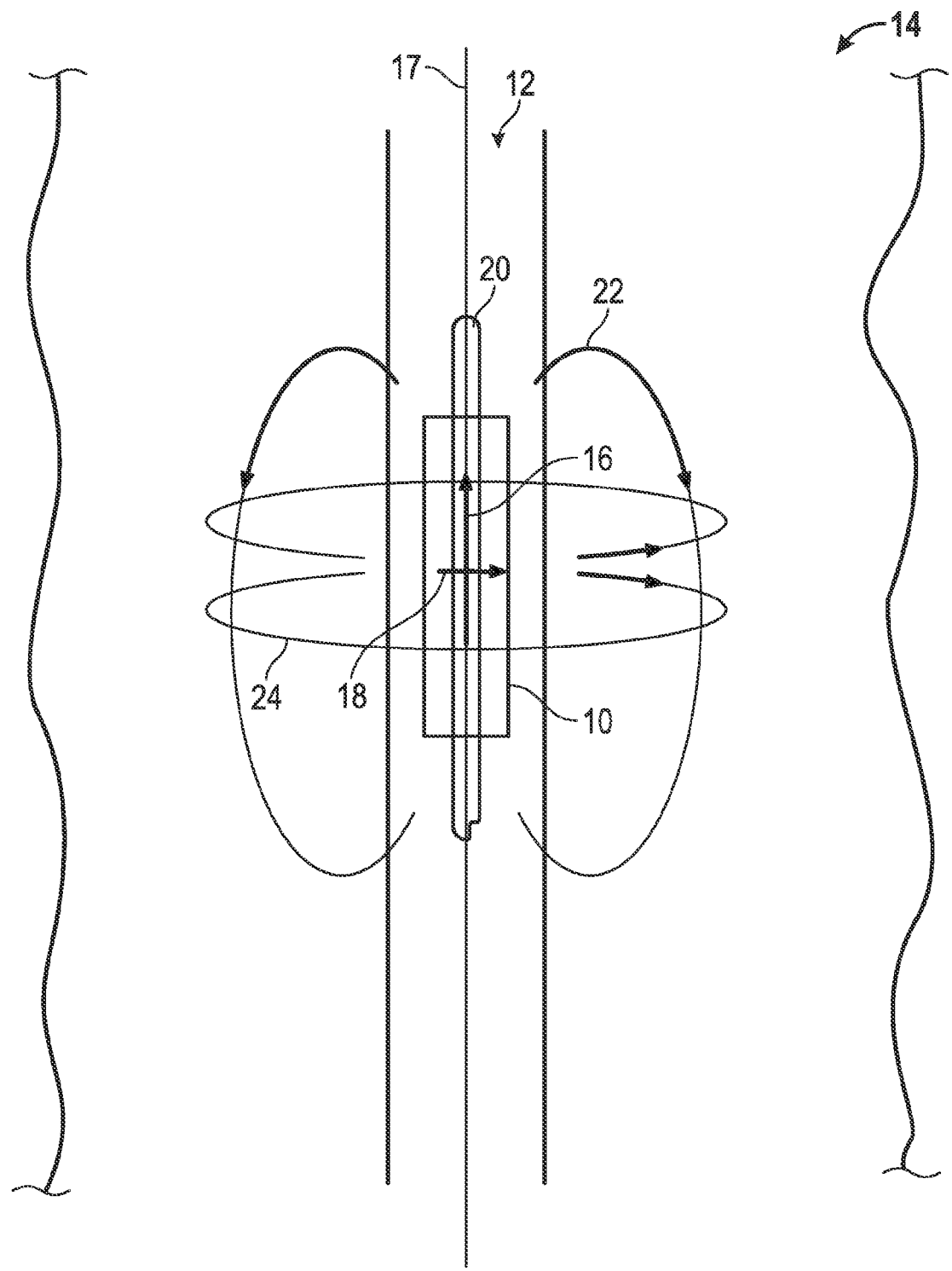
FIG. 1 shows a magnetic dipole antenna in which an embodiment of the invention can be utilized and which can be used in practicing the method of the invention.

FIG. 1 represents an example of a magnetic dipole transmitter antenna assembly 10 placed in a borehole 12 surrounded by the earth formations 14. The antenna can be used with an induction well logging or an induction MWD instruments with receiver antennas (not shown in FIG. 1) spaced axially apart from the transmitter antenna. The antenna assembly can comprise a longitudinal dipole 16 directed along the borehole axis 17 and optionally one or two transversal magnetic dipoles 18 in order to energize the earth formations 14 in different directions. Examples of the magnetic flux density lines in the formations 14 surrounding the borehole 12 are shown at 22 and 24 for the longitudinal dipole 16 and a transversal dipole 18 respectively. Magnetic field produced by an alternated magnetic dipole generates eddy currents in the conductive earth formations 14. In case of the longitudinal dipole 16 the currents lines are circles in the planes perpendicular to the borehole axes and centered at the axis 17 (the current lines are not shown in FIG. 1). In case of the transversal magnetic dipole 18 the eddy currents (not shown n FIG. 1) flow substantially parallel to the borehole axis and perpendicular to the direction of the dipole. Different directions of the eddy current produced by orthogonal dipoles 16 and 17 probe conductivity of the earth formations in different directions thus allowing for assessment of anisotropy of electrical conductivity of the formations.

A part of the antenna assembly is a metal support 20 that could be drill collar in case of performing measurements-while-drilling.

Figure 2:
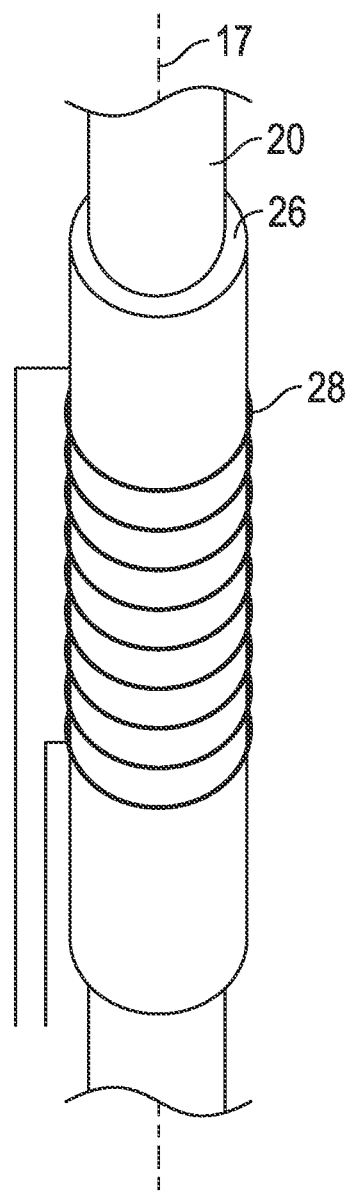
FIG. 2 depicts a simplified layout of a longitudinal magnetic dipole antenna.

Turning now to FIG. 2, a more detailed layout of a simplified longitudinal dipole antenna assembly is presented. The antenna assembly comprises a magnetic core 26 made of a high permeability magnetic material surrounding the metal support 20 and a coil 28 that wound around the magnetic core 26. The coil 28 generates magnetic field having direction substantially parallel to the axis 17 that coincides with the axis of the core. Due to high permeability of the magnetic core 26 the dominant part of the total magnetic flux of the antenna is concentrated in the core and increases the dipole moment for a given current in the antenna coil 28. The magnetic core also ensures that no significant magnetic field passes from the coil 28 to the metal support 20. The simplified layout of FIG. 2 can represent both a known in the art antenna assembly and an embodiment of the present invention.

Figure 3A:
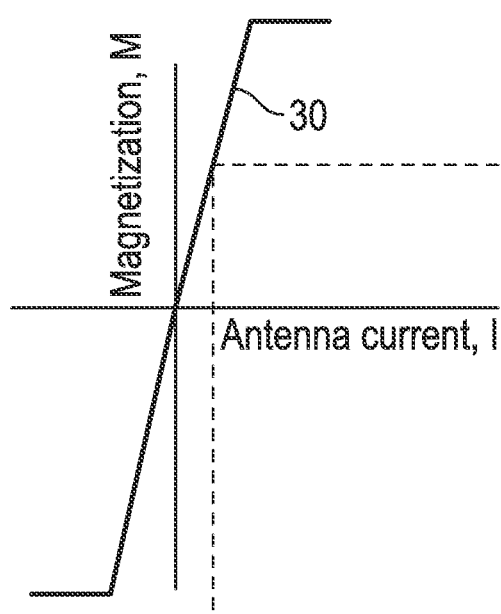
FIG. 3A, FIG. 3B and FIG. 3C show respectively magnetization of the soft magnetic core versus current in the antenna coil, time diagram of the current in the antenna coil and time diagram of the resultant magnetization of the magnetic core in according with an embodiment of the transmitter antenna in an induction time domain logging tool of prior art.
Figure 3B:
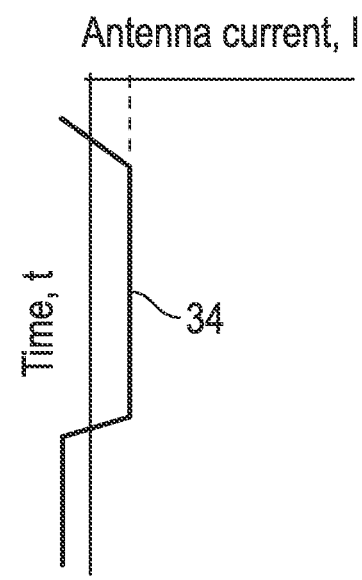
Figure 3C:
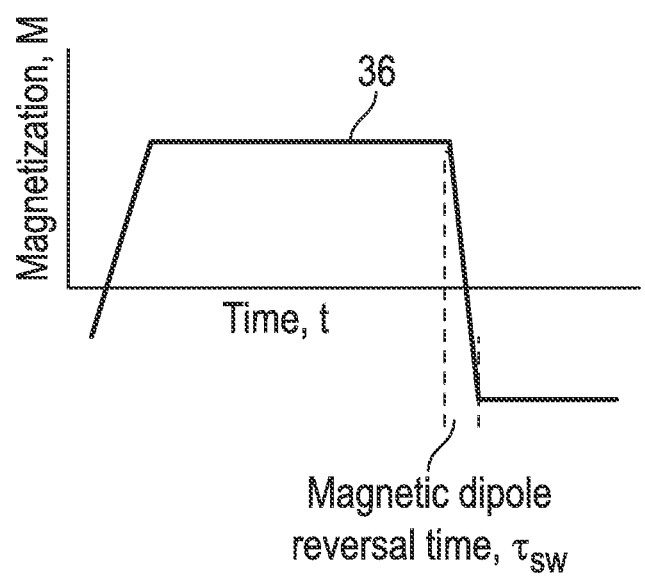

FIG. 3A, FIG. 3B and FIG. 3C show respectively magnetization of the soft magnetic core versus current in the antenna coil, time diagram of the current in the antenna coil and time diagram of the resultant magnetization of the magnetic core in accordance with an embodiment of the antenna in an induction time domain logging tool of prior art. The antenna assembly known in the art uses conventional high permeability magnetic material with substantially no magnetic hysteresis. A simplified magnetization curve for the magnetic core of prior art is represented by substantially a straight line 30 in FIG. 3A. As will be readily appreciated by those skilled in the art, the slope of the line for a typical high magnetic permeability magnetic materials is mainly determined by the length-to-diameter ratio of the magnetic core. An explanation for this can be found, for example in E. C. Snelling, Soft Ferrites (Properties and Applications), London ILIFE BOOKS LTD or R. M. Bozorth, Ferromagnetism, IEEE PRESS, IEEE Inc, New York. The antenna coil (28 in FIG. 2) is energized with the electric current according to the time diagram in FIG. 3B. In order to perform transient induction measurement the current can be supplied in the form of alternated polarity pulses (square wave) with relatively short rise and fall time as shown at 34. The acquisition of transient signal from the surrounding earth formations starts right after the current is switched. The switching time of the current determines the ability of the measurements to acquire the fast part of the transient signals coming primarily from the near zone of the surrounding earth formations while the duration of the pulses is chosen long enough in order to allow for acquiring the slow part of the signal that reflects the transient response from remote areas of the earth formations. In some practical cases it is desirable for the switching time to be as short as 3-5 μs and the duration of the pulse as long as 1000 ms. The waveform of the current shown in FIG. 3B causes time variation of the magnetization of the magnetic core shown in FIG. 3C at 36. The magnetic dipole moment of the antenna and correspondingly the magnetic field strength in the surrounding earth formations is proportional to the magnetization presented in FIG. 3C. As can be seen from the FIGS. 3A, B, C the transmitter antenna of prior art requires that in order to maintain constant magnetic dipole moment of the antenna and correspondingly, constant magnetic field in the formation it is required that a constant current flow in the antenna coil. As will be explained below in details the constant current is the main source of power losses related to generation of magnetic field.

Figure 4A:
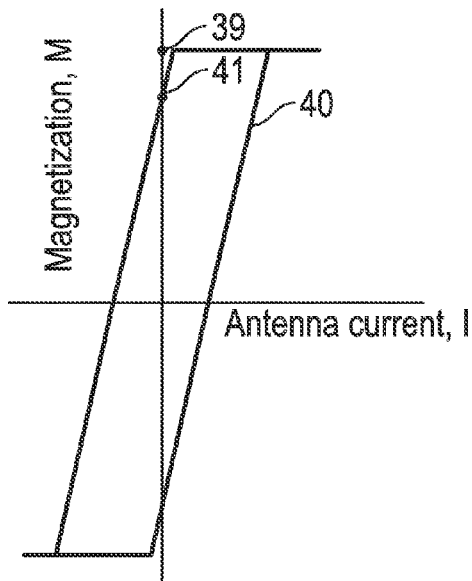
FIG. 4A, FIG. 4B and FIG. 4C show respectively magnetization of the soft magnetic core versus current in the antenna coil, time diagram of the current in the antenna coil and time diagram of the resultant magnetization of the magnetic core in according with an embodiment of the transmitter antenna in an induction time domain logging tool of the present invention.
Figure 4C:
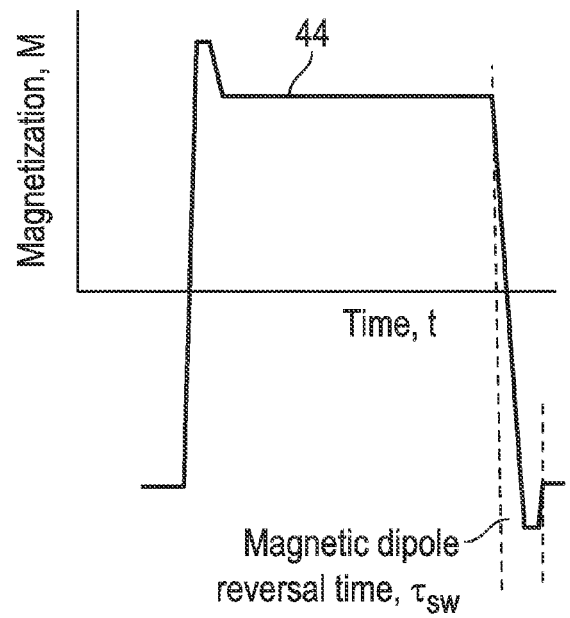
Figure 4B:
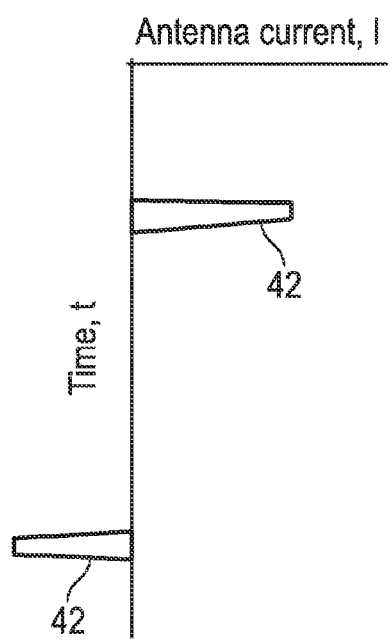

FIG. 4A, FIG. 4B and FIG. 4C show respectively magnetization of the soft magnetic core versus current in the antenna coil, time diagram of the current in the antenna coil and time diagram of the resultant magnetization of the magnetic core in accordance with an embodiment of the transmitter antenna of the present invention. The magnetic core (26 in FIG. 2) is made of a magnetic material having substantial magnetic hysteresis. A simplified magnetic hysteresis loop representing magnetization and magnetization reversal process in such materials shown at 40 in FIG. 4A. The waveform of the current driving the antenna coil of the present invention is shown in FIG. 4B at 42. Corresponding to the waveform of the driving current magnetization of the magnetic core is presented in FIG. 4C at 44. As can be seen from the FIGS. 4A, B, and C the transmitter antenna of the present invention needs to be driven by current in the coil only during switching magnetization in the magnetic core. No current in the coil is required to maintain constant magnetic dipole moment of the antenna and correspondingly, to keep surrounding formation energized between consecutive switches. The magnetic core effectively stores magnetic energy in residual magnetization. The energy loss occurs only during magnetization reversal. As will be readily appreciated by those skilled in the art the losses are proportional to the area enclosed in the hysteresis loop. Since the switching phase of the formation energizing cycle is at least 1000 times shorter than the steady-state phase, the power consumption associated with operation of the transmitter antenna of the present invention is much lower that of the prior art.

Factors that put practical limits to the achievable strength of the antenna dipole moment in an electromagnetic induction transient instrument of prior art as well as of the present invention will be explained below to highlight the advantages of the present invention.

The dipole moment of the magnetic dipole antenna is calculated as follows:

$$p_m = M \cdot s \cdot l, \qquad (1)$$

where M is the magnetization of the magnetic core 26 (FIG. 2), s and l are respectively the effective cross-sectional area and the length of the magnetic core. A practical assumption is made here of that the main magnetic flux of the antenna is concentrated in the core. The magnetization M for the longitudinal dipole presented in FIG. 2 can be expressed as $$M = \chi_{\text{eff}} \cdot H_e = \frac{\chi_{\text{eff}} \cdot I \cdot N}{l} \qquad (2)$$

where $\chi_{\text{eff}}$ is the effective magnetic susceptibility, $H_e$ is the external magnetic field intensity produced by the antenna coil 28; I is the current in the antenna coil during the pulse, l is the effective length of the antenna, and N is the number of turns in the antenna coil.

Then for the magnetic dipole moment we readily get $$p_m = \chi_{\text{eff}} \cdot I \cdot N \cdot s. \qquad (3)$$

Maximum voltage on the antenna coil 28 associated with switching polarity of the magnetic dipole moment is approximately $$V_{max} = L \cdot \left(\frac{dI}{dt}\right)_{max} \approx \frac{2 \cdot I \cdot L}{\tau_{sw}}, \qquad (4)$$

where $\tau_{sw}$ is the required switching time, and L is the antenna inductance that can be estimated as follows $$L \approx \mu_0 \cdot \chi_{\text{eff}} \frac{N^2 \cdot s}{l}. \quad (5)$$

As can be seen from the equation (4), a short switching time can cause unacceptably high voltage on the coil if the coil inductance is not chosen properly. Assume that the voltage is limited to a certain value $V_{max}$ and the targeted dipole magnetic moment of the antenna and the switching time are respectively $p_m$ and $\tau_{sw}$. Then combining the equation (1)-(5) we readily arrive to the following equation for the current driving the antenna of prior art during the steady-state phase of the formation energizing cycle $$I = \frac{\mu_0 \cdot p_m^2 \cdot}{2 \cdot \chi_{\text{eff}} \cdot \tau_{sw} \cdot s \cdot l \cdot V_{max}}. \quad (6)$$

The power losses associated with the current presented by equation (6) are the loss in the antenna coil wire and the loss due to finite conductivity of the electronic switches in conductive state. The first type of losses in case of low inductance antenna can be neglected. The power loss in the switches that may cause overheating the transmitter electronic can be estimated as follows $$P_{loss(prior\_art)} \approx V_{on} \cdot I, \quad (7)$$

where $V_{on}$ is on-state voltage of the switch, and I is the current calculated according to equation (6).

Since the switching phase of the formation energizing cycle is typically at least 1000 times shorter than the steady-state phase, the power losses during switching phase can be neglected compared to the power loss according to equation (7).

As will be shown in the example below the power loss presented by the equations (6) and (7) place clear limit on the achievable target parameters $p_m$ and $\tau_{sw}$ in the methods and apparatuses of prior art.

According to the method of present invention the power losses exist only during switching the polarity of the magnetic dipole of the antenna while during the long steady-state phase the dipole moment is maintained by the residual magnetization of the magnetic core. The losses are caused by the irreversible processes (hysteresis) associated with magnetization reversal in magnetic core. It is well known in the art that energy lost during fill cycle of magnetization changes can be presented as the area enclosed in the hysteresis loop in $\mu_0 M$-$H_e$ coordinates multiplied by the volume of the core (see for example Chikazumi S, Physics of Magnetism, John Wiley and Sons, New York, 1964). An example of a simplified hysteresis loop with substantial hysteresis is presented in FIG. 4A (magnetic field intensity is proportional to the current in the antenna coil as explained at equation (2)). For the simplified shape of the hysteresis loop presented in FIG. 4A the energy loss due to hysteresis can be expressed as follows $$W_h \approx \mu_0 \cdot 4 \cdot M_s \cdot H_c \cdot s \cdot l, \quad (8)$$

where $M_s$ is the saturation magnetization presented in FIG. 4A at 39, $H_c$ is the coercive force defined as the external magnetic field corresponding to zero magnetization on the hysteresis loop of the of the magnetic core. As was explained before the external magnetic field that causes changes in magnetization of the magnetic core is generated by the current in the antenna coil 28 in FIG. 2.

Figure 4D:
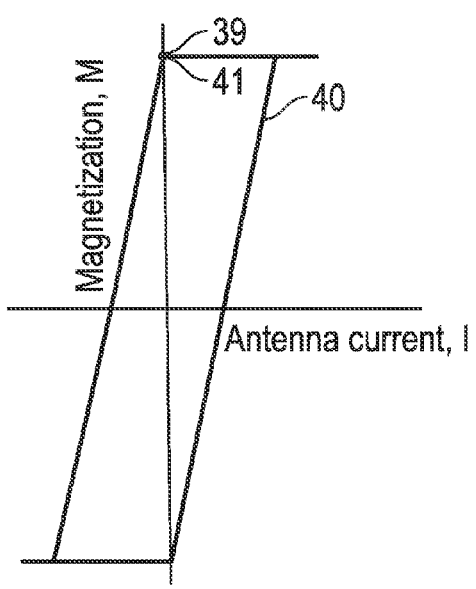
FIG. 4D illustrates optimal choice of the parameters of the magnetic core.

The energy loss presented by equation (8) is associated with magnetization switching and occurs only during magnetization reversal in the magnetic core. Then taking into account equation (1) for the magnetic dipole moment the average power loss over the cycle of measurement of transient response can be given as follows:

$$P_{loss} = \mu_0 \cdot \frac{4 \cdot p_m \cdot H_c}{T}. \quad (9)$$

where T is the duration the cycle of measurement of transient response that is approximately the same as the time between two consecutive switches of magnetization of the magnetic core. An assumption is made of that the residual magnetization is approximately equal to the saturation magnetization. In general the residual magnetization of the magnetic core (shown at 41 in FIG. 4A) can be either lower or approximately equal to the saturation magnetization (presented by point 39 in FIG. 4A) depending on relationship between magnetic and geometric parameters of the magnetic core. The case where the residual magnetization reaches the saturation magnetization (the point 39 and 41 coincide) is presented in FIG. 4D. This case corresponds to maximum dipole moment of the antenna for a given power loss. In order for saturation magnetization and residual magnetization of the core to be substantially equal the following two conditions should be met. First, the magnetic material itself should have almost rectangular hysteresis loop when measured in closed magnetic circuit configuration (no magnetic poles), second the following relationship between parameter of hysteresis loop as measured on the core (magnetic poles are located near the ends of the core and create so called demagnetizing field) must hold $$\frac{M_s}{\chi_{\text{effm}}} \leq H_c \quad (10)$$

$\chi_{\text{effm}}$ is the maximum effective magnetic susceptibility defined as maximum slope on the ascending or descending parts of magnetic hysteresis loop and the other quantities are the same as in equation (8). As will be readily appreciated by those skilled in the art, said slope is mainly determined by the elongation ratio of the magnetic core, the maximum effective susceptibility can be controlled by varying the elongation ratio. In order to satisfy the inequality (10) the saturation magnetization $M_s$ and coercive force $H_c$ can be also controlled by choosing magnetic materials. Yet another way to get a desired $M_s$ is to make a layered core in which magnetic material is separated by a non-magnetic binding material in order to reduce packing density of magnetic material in the core and correspondingly reduce the net magnetization of the core. Examples of such material are given below. In case maximum possible dipole moment is the main objective in designing the transmitter antenna the product of magnetization and the effective cross-sectional area of the core should be kept possibly high. For a given length of the antenna this would result in high ratio $$\frac{M_s}{\chi_{\it{effm}}}$$

and require material with higher coercive force $H_c$ in order to satisfy the equation (10).

Figure 5:
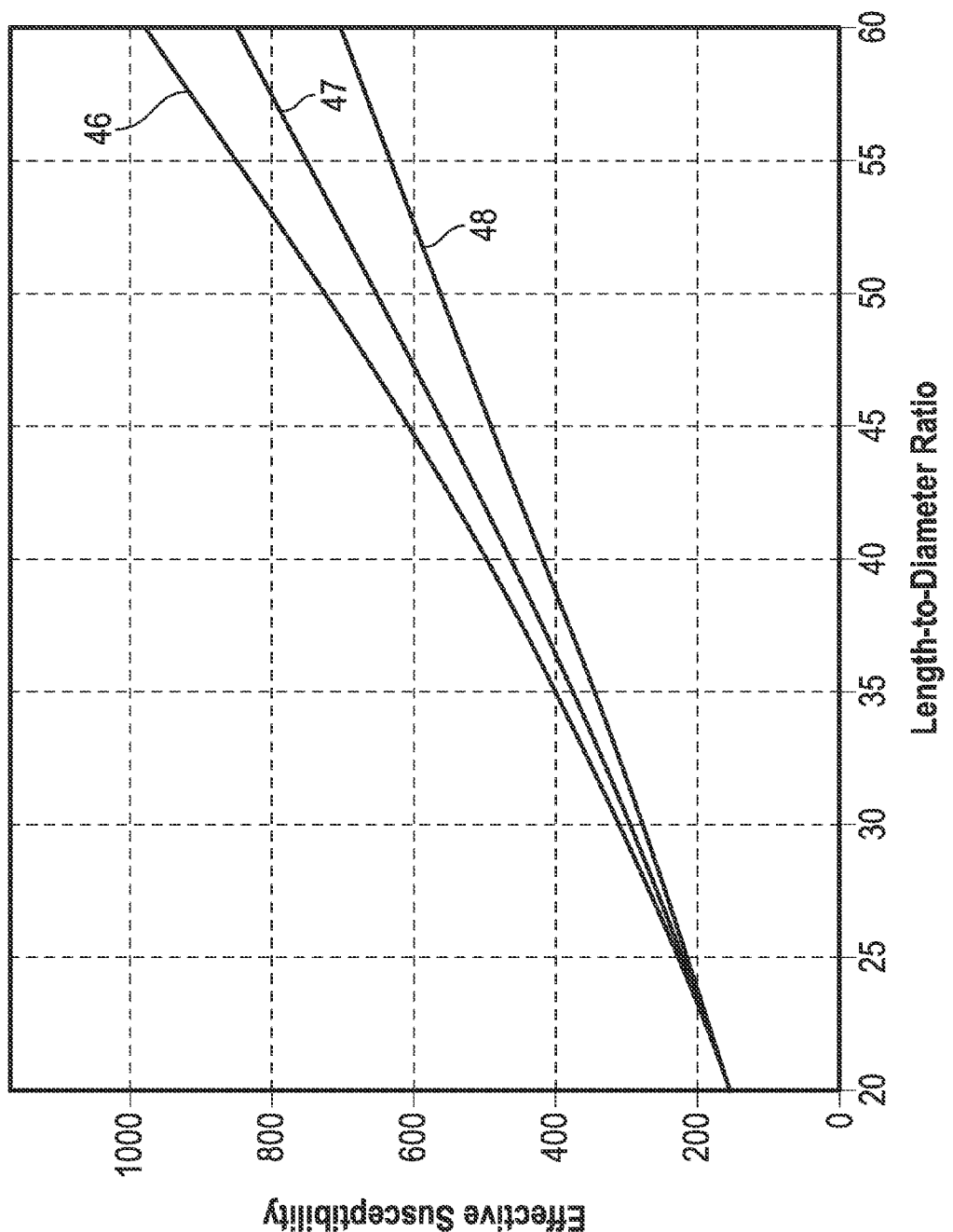
FIG. 5 is a graph showing effective magnetic susceptibility of the magnetic core as a function of the core dimensions.

As was mentioned before the effective magnetic susceptibility is primarily determined by the elongation of the magnetic core that is by its geometric parameters s and l. The calculated numbers for rods with different elongation (length-to-diameter ratio) can be found, for example, in E. C. Snelling, Soft Ferrites (Properties and Applications), London ILIFE BOOKS LTD cited above. An example of the dependence of effective susceptibility on length-to-diameter ratio of a magnetic rod is presented in FIG. 5. The curves 46, 47 and 48 in FIG. 5 corresponds to different magnetic susceptibilities of magnetic material of the rod: respectively to 10000, 4000 and 2000. As can be seen in FIG for a practical range of length-to-diameter ratio of 20-60, the effective susceptibility is 150-800. Then assuming $M_s$=0.8 MA/m (corresponds to the saturation flux density $B_s=\mu_0 \cdot M_s$=1T) and using condition described by (10) we determine the following desired range of coercive force: $H_c$=1.5-8 kA/m. The dipole moment corresponding to $M_s$=0.8 MA/m, l=1 m and length-to-diameter ratio equal to 50 is 700 A·m². The last number is equivalent to 1400 A·m² for the magnitude of switching of the dipole.

The preferable range 1.5-8 kA/m for the coercive force can be achieved for example by using magnetic materials such as rolled permalloy (magnetic properties of this type of materials can be found for example in sited above R. M. Bozorth, Ferromagnetism, IEEE PRESS, IEEE Inc, New York), some amorphous ribbons or some types of ferrites.

Figure 6:
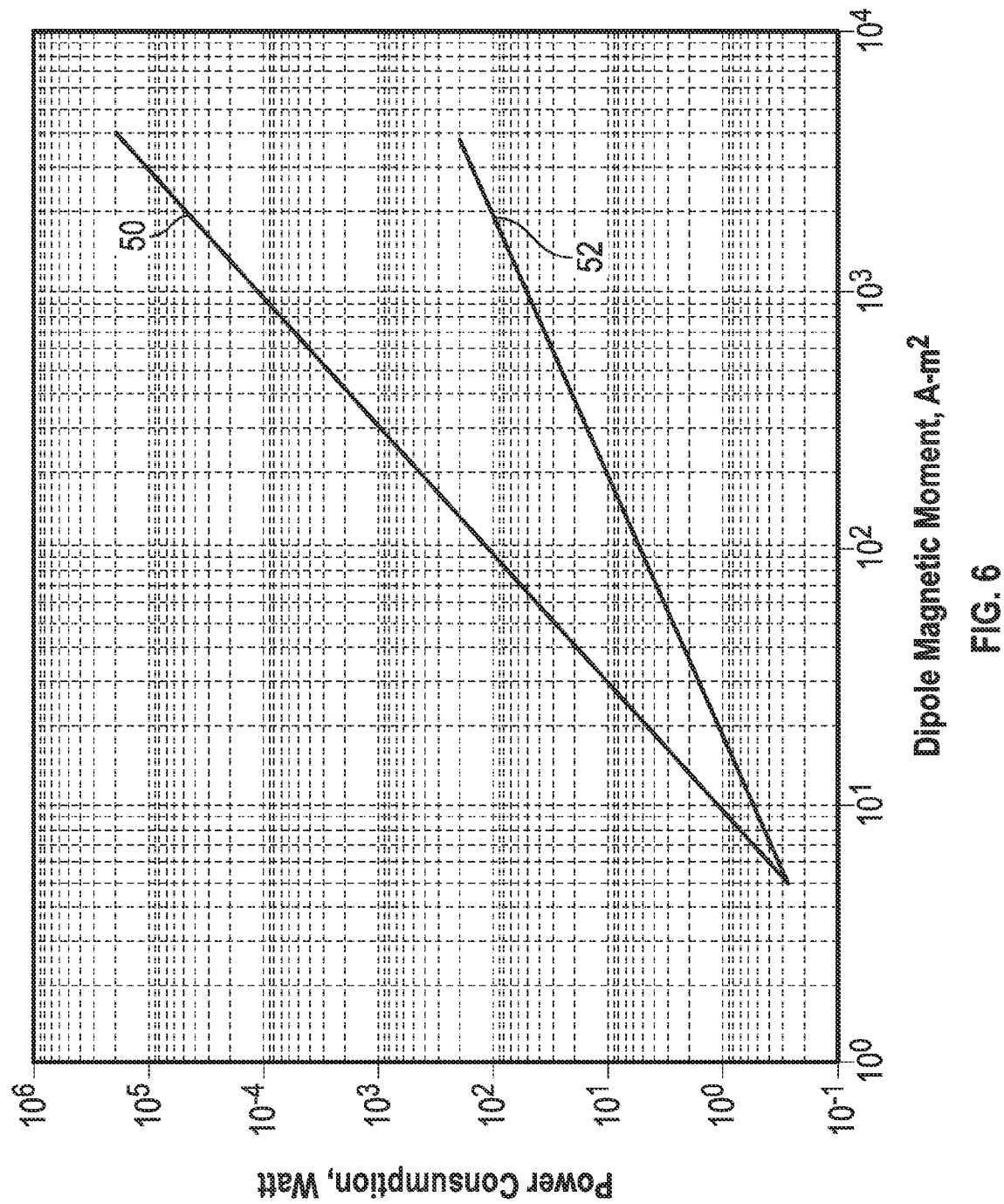
FIG. 6 is a diagram showing power consumption of a longitudinal antenna of FIG. 2 as a function of magnetic dipole moment of the antenna, for the antenna embodiment of the present invention in comparison with that of prior art.

FIG. 6 is a diagram showing power consumption as a function of magnetic dipole moment of the longitudinal antenna of FIG. 2. Data for the antenna of prior art in comparison with an antenna embodiment of present invention, respectively shown at 50 and 52 in FIG. 6. The data was calculated according to equations (6) and (7) for prior art and equation (9) for the present invention. The following practical numbers were used for the calculations: $\chi_{\it{eff}}$=150, $\tau_{sw}$=3 µs, s=0.002 m², l=1 m, $V_{max}$=1000V, $V_{on}$=3.9V (the number for the on-state voltage of the switch is taken from Advanced Power Technology catalog for IGBT type switch APT75GP120B2), $H_c$=1 KA/m, T=100 ms. The effective magnetic susceptibility $\chi_{\it{eff}}$ was taken from the data presented in FIG. 5 at 48 for the length-to-diameter ratio calculated as follows:

$$\frac{1}{\sqrt{4 \cdot s/\pi}}.$$

As can be seen in FIG. 6 the power consumption for the transmitter antenna of prior art and of the present invention while similar for small dipole moments (less than 10 A·m²) dramatically differ at larger dipole moments. For example generating the dipole moment of 1000 A·m² would take as much as 10 kW DC power for the antenna of the prior art and only about 50 W of DC power for the antenna according to an embodiment of present invention. It is obvious for those skilled in the art that the greater dipole moment of the transmitter antenna the deeper penetration into earth formations can be achieved. It should be understood from the data presented in FIG. 6 that high power dissipation and heat removal problems make it impractical for methods and apparatuses of prior art to achieve a dipole moment of more than 100 A·m², especially in MWD application, while for the transmitter antenna of the present invention the dipole moments in excess of 1000 A·m² are quite feasible.

It will be also readily understood by those skilled in the art that in the antenna of prior art it is hard to achieve stability of the dipole magnetic moment of the antenna because of heating of the switches and the antenna coil resulting in instability of the antenna current. In the present invention the magnetic dipole of the antenna is determined primarily by the magnetization of the magnetic core. The magnetic properties of the magnetic core are inherently more stable with temperature then electric conductivity of a semiconductor junction in a transistor switch. Since power dissipated in the core material employed in the embodiment of the present invention is relatively small the core heating is negligible, which makes the core magnetization even more stable.

Figure 7:
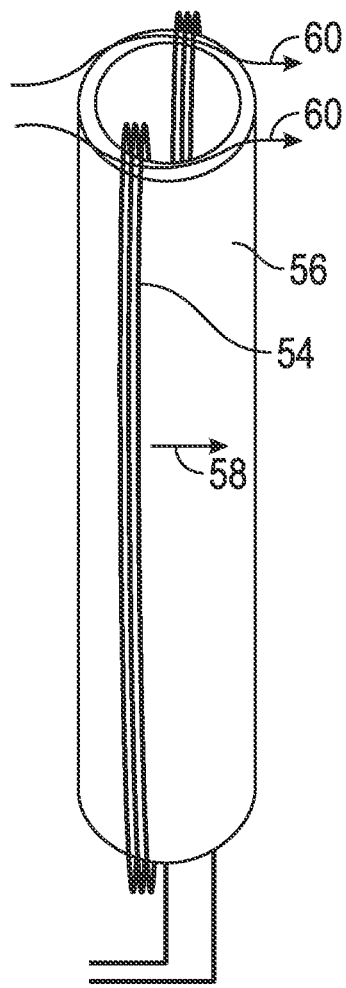
FIG. 7 shows a simplified layout of a magnetic core with the antenna coil for a transversal magnetic dipole antenna.

Reference is now made to FIG. 7 where an embodiment of the transversal dipole antenna is presented. The antenna winding 54 and the magnetic core 56 are arranged to produce magnetic dipole moment 58 directed perpendicular to the axis of the antenna (17 in FIG. 2). Two magnetic flux lines are shown at 60 in FIG. 7. It will be readily understood by those skilled in the art that in order to achieve substantial residual magnetization in transversely magnetized magnetic core a higher coercive force of the core material is required as compared to that of the longitudinally magnetized core. This means that in case of two or three directional transmitter antenna two separate coaxial cores should be preferably used.

Figure 8A:
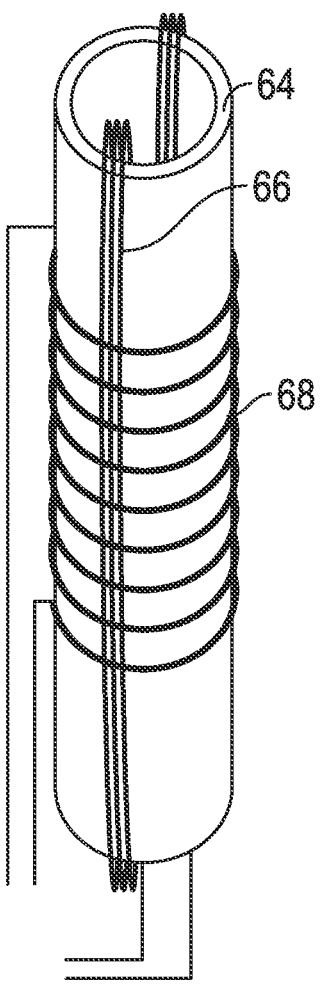
FIG. 8A and FIG. 8B show a simplified layout of a magnetic core with the antenna coils for a two directional magnetic dipole antennas respectively for one sectional isotropic magnetic core and a magnetic core comprising of two section with different magnetic properties.
Figure 8B:
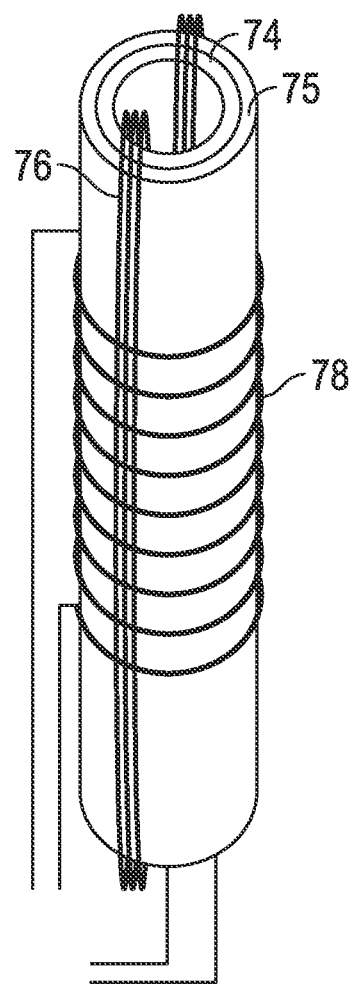

FIG. 8A and FIG. 8B present two possible embodiments for two-directional magnetic dipole antenna. FIG. 8A presents an embodiment with one isotropic core that has the same magnetic properties in both directions of magnetization. The magnetic core is shown at 64, transversal and longitudinal coils are shown respectively at 66 and 68 This embodiment is simpler in implementation but can not provide optimal conditions presented by expression (10) for both longitudinal and transversal directions. FIG. 8B represents an embodiment with two coaxial magnetic cores 74 and 75 having different magnetic properties, each core having preferred magnetization direction and higher residual magnetization in the direction of its external magnetic field generated by coils 76 (transversal) or 78 (longitudinal). It will be readily appreciated by those skilled in the art that yet another core and additional transversal coil orthogonal to the ones presented in FIGS. 8A and B at 66 and 76 respectively can be used to make three-directional antenna.

Figure 9A:
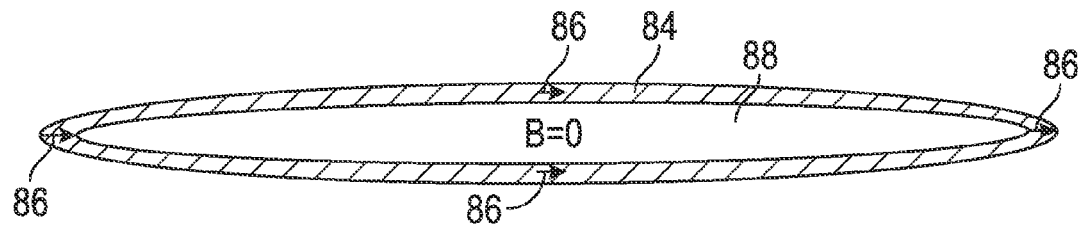
FIG. 9A-FIG. 9D are to illustrate the fact of substantially zero magnetic field inside a uniformly magnetized magnetic core facilitating practically no interaction between the antenna magnetic field and any conductive parts inside the antenna, as well as practically no interaction between section with different magnetic properties in an embodiment of FIG. 8B.
Figure 9B:
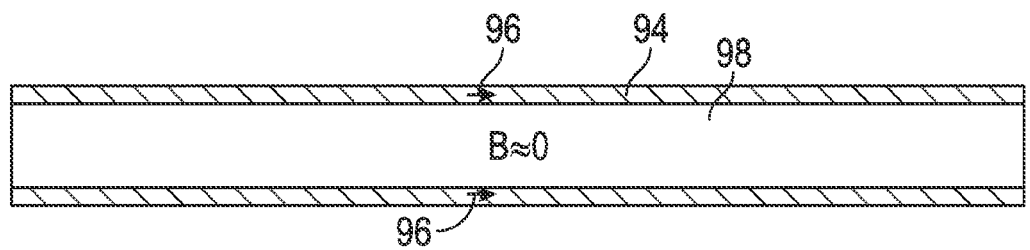
Figure 9C:
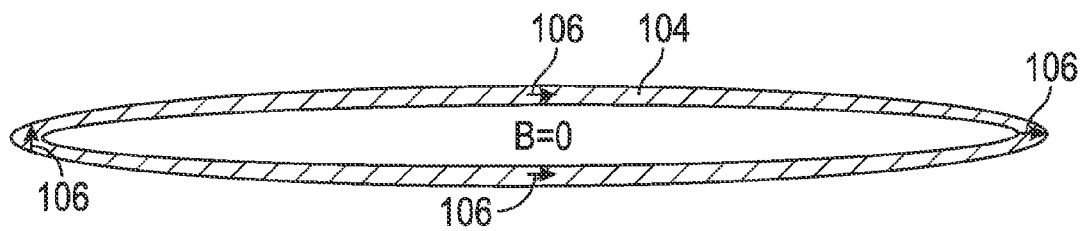
Figure 9D:
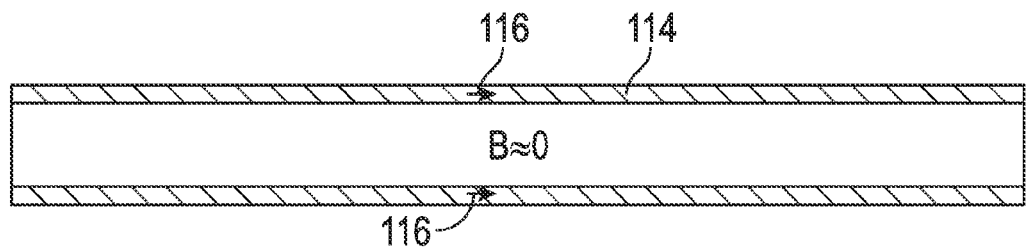

An important feature of the magnetic core employed in the transmitter antenna is that it serves as a magnetic shield that prevents the magnetic field of the antenna coil from affecting the rest of the antenna assembly located in the inner space of the magnetic core. This fact is illustrated in FIGS. 9A, B, C and D. FIG. 9A depicts an elliptic shell 84 uniformly magnetized in the direction 86 of the long axis. It should be understood that magnetic field in the inner space of the shell 84 is zero. One way to explain this is to use notion of magnetic charges defined as discontinuity of the normal to the surface component of the magnetization of a magnetized body. In case uniformly magnetized elliptic shell the magnetic charges of the outer and inner surfaces produce equal magnitude, opposite direction uniform magnetic fields in the inner space. Thus total magnetic field in the inner space 88 of the elliptic shell is exactly zero. This is approximately true in case of long cylindrical magnetic core presented in FIG. 9B. The fact that internal magnetic field of the uniformly magnetized cylinder 94 (magnetization of the cylinder is presented by arrows at 96) is substantially zero means that substantially no variable magnetic field is generated in the inner space 98 of the cylinder 94 when magnetization 96 is reversed during generating transient processes in the earth formations. Thus neither conductive parts (i.e. drill collar in case measurements while drilling) inside the magnetic core nor other coaxial core (see FIG. 8B at 74) will be affected by the magnetic core during its magnetization reversal. In case of two coaxial cores it is important that the external magnetic field of the inner one substantially does not effect the magnetization of the outer one. This requires that the outer core be the one with higher coercive force. FIGS. 9C and D illustrate the same effect of zero magnetic field in the inner space of the elliptic shell 104 and substantially zero magnetic field in the inner space of the magnetic core 114 in case of uniform transversal magnetization (106 and 116 in FIGS. 9C and D respectively).

It should be understood that in order to correct for a small residual magnetic field in the inner space near the ends of the core a distribution of current density of the antenna coil along its axis could be employed.

Figure 10A:
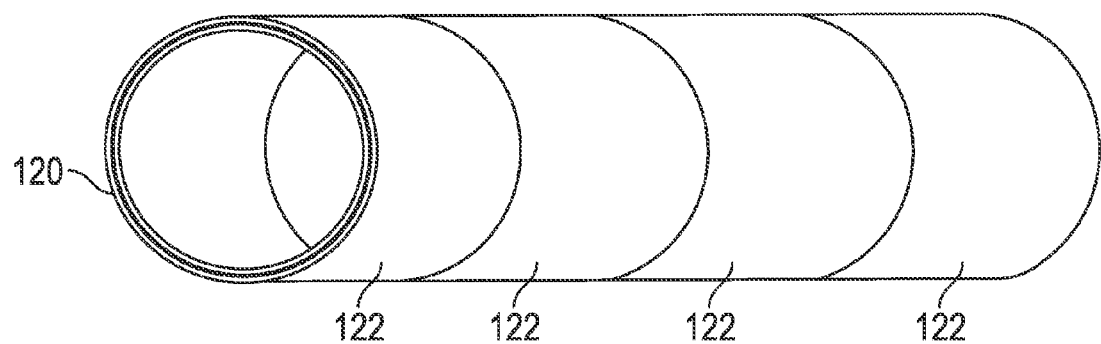
FIG. 10A and FIG. 10B show two different layouts of a magnetic core made of thin metal ribbons.
Figure 10B:
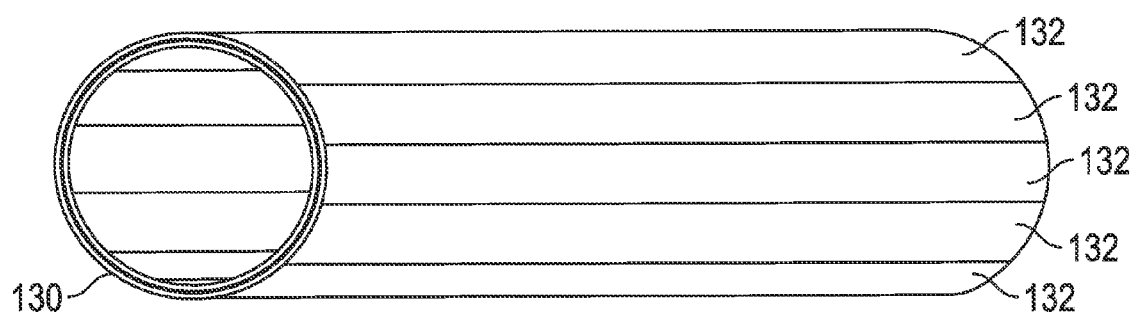

FIGS. 10A and 10B represent a layered magnetic material that is preferably used for magnetic core. The layered material is made of thin tapes of magnetic metal (shown at 120 and 130 in FIGS. 10A and 10B) separated with nonconductive layers. The magnetic metal can be, rolled permalloy or magnetic amorphous tape. The core may be assembled from ribbon wound rings shown at 122 in FIG. 10A) or from packs of tapes shown at 132 in FIG. 10B. The average magnetization of the core depends on the fraction of the magnetic material in the cross-sectional area of the core. The saturation magnetization of the core should preferably obey the condition presented by the expression (10). It should be understood that during switching of the magnetic field of the antenna coil there will be eddy currents generated in magnetic layers. This will cause delay in building up the average magnetization of the core and affect the rate of switching of magnetic dipole of the antenna. To ensure that the delay does not exceed the switching time required to perform transient measurement the magnetic layers must be thin enough. In frequency spectrum terms this means that the thickness should be substantially smaller than the electromagnetic skin depth for the maximum frequency of the spectral band of the transient signal. If, for example, the required switching time is less than 5 microseconds, then the thickness of the magnetic layers should not typically exceed 10 micrometers.

It should be also understood that other magnetic materials can be used in the antenna of the present invention. For example magnetic ferrite materials that are inherently nonconductive can be effectively employed if manufactured to have proper magnetic parameters discussed earlier above.

Figure 11:
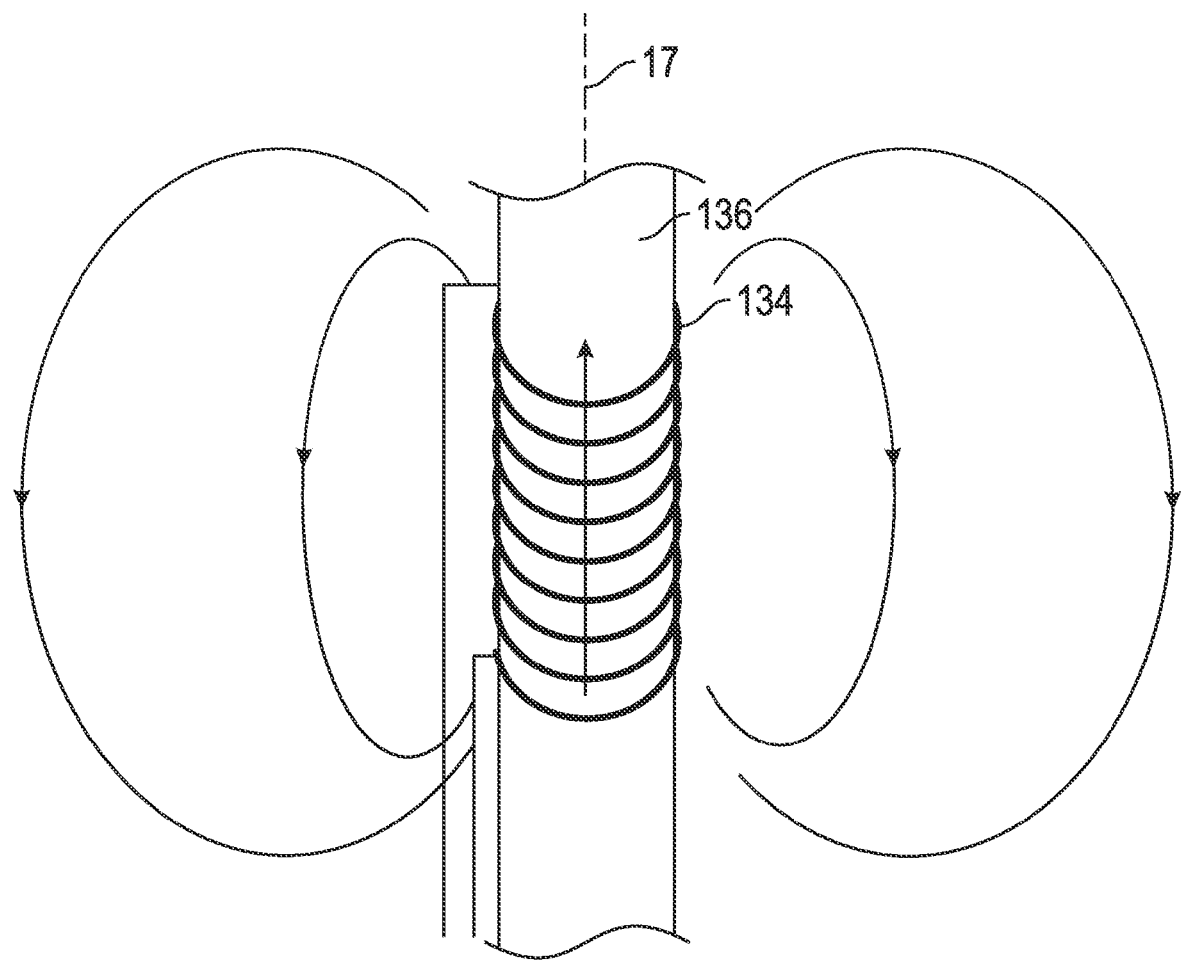
FIG. 11 depicts a simplified layout of a transmitter antenna that uses drill collar as a magnetic core in order to perform deep-looking transient induction measurements of the earth formations.

It should be understood by those skilled in the art that in case of investigating of regions that are particularly deep in the earth formations the switching time for the antenna dipole does not have to be short. FIG. 11 depicts a simplified layout of the embodiment of an efficient transmitter antenna suitable for the deep penetration measurement while drilling. The antenna coil 134 is wound around the drill collar 136 that itself serves as the magnetic core. The material of the collar is typically a ferromagnetic metal (high strength steel) having substantial hysteresis, and therefore relatively high residual magnetization. It should be understood from the explanation earlier above (see expression (10)) that the residual magnetization will also depend on the length-to-diameter ratio of the magnetized part of the collar. It should be also understood that magnetization delay due to conductivity of the material of the collar is not a problem in case of deep investigation: the signal from deep regions of the earth formations typically comes well after the magnetization reversal of the collar is complete.

Figure 12A:
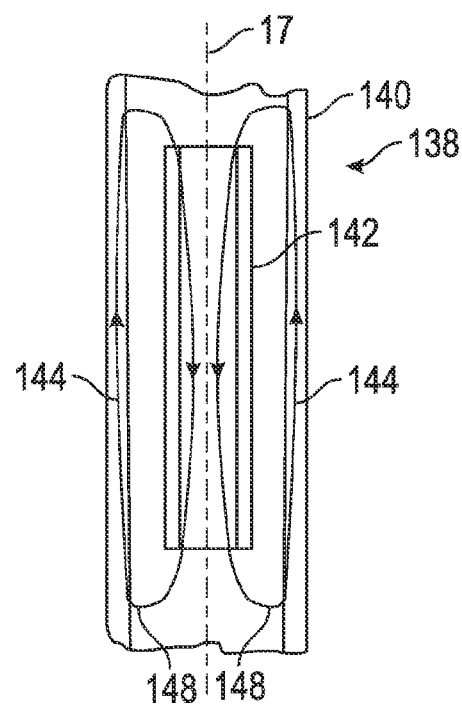
FIG. 12A-FIG. 12D represent an embodiment of the transmitter antenna for deep-looking transient measurements when logging cased wells. The figures illustrate the fact that a fragment of the casing while preventing magnetic field of the antenna from penetrating outside the casing when current in the antenna is "on" produces a substantial magnetic field outside the casing due to residual magnetization of the fragment when the antenna current is "off".
Figure 12B:
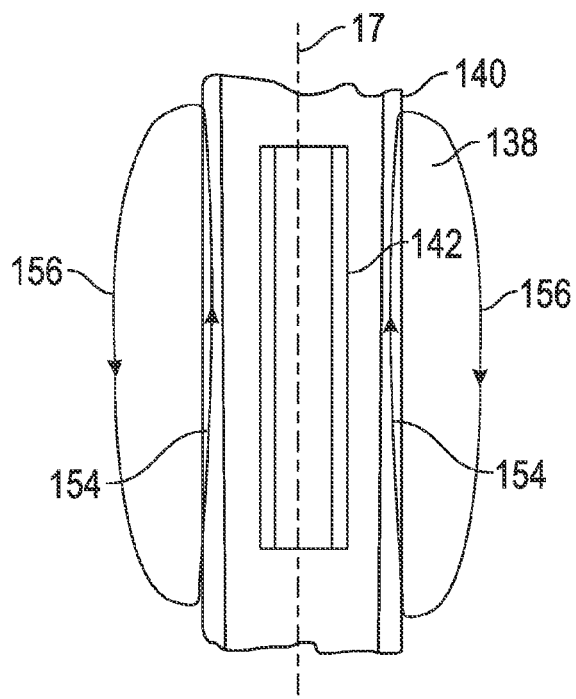
Figure 12C:
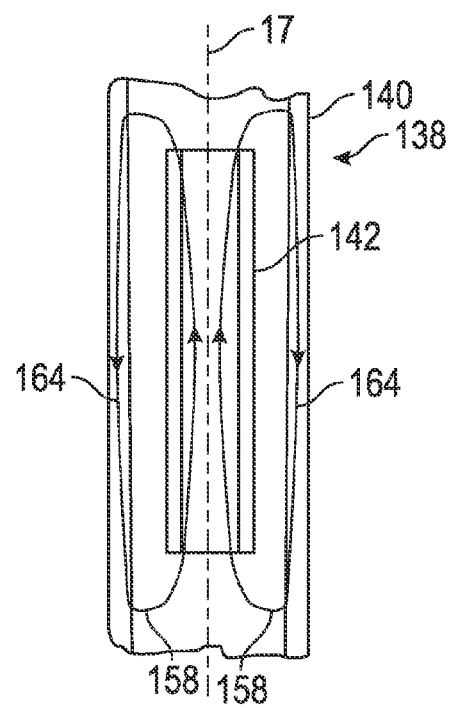
Figure 12D:
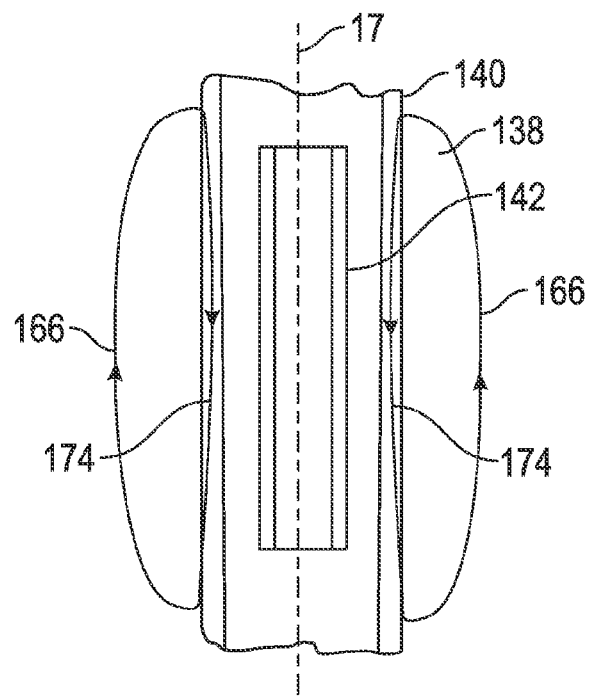

Yet another embodiment of the transmitter dipole antenna according to the present invention is illustrated in FIGS. 12A, B, C and D. This embodiment gives a solution for the problem of deep investigation when logging cased wells. Main problem of induction logging through casing is illustrated in FIG. 12A where a fragment 138 of the casing is presented. The wall 140 of the casing is typically made from low carbon steel having relatively high conductivity and high magnetic susceptibility. The magnetic flux inside the casing can be generated by antenna coil (a solenoid having the same axis 17 as the bore hole) shown at 142 in FIG. 12A. After switching on current in the solenoid the magnetic flux 148 generated by the coil 142 penetrates the wall 140 of the casing and after some delay settles inside the wall as shown at 144. It should be understood that due to high permeability of the wall 140 practically all the flux lines (represented by two lines at 148) generated by the coil close inside the casing wall. The total magnetic flux in the wall 140 is practically the same as the total magnetic flux of the coil 142 and has opposite direction. This means that substantially no magnetic field will be generated outside the casing. In other words the casing acts as a good shield between the magnetic field source (coil 142) and the earth formations. FIG. 12B presents the case when the current in the coil 142 is switched off. Crucial role in this situation plays the residual magnetization 154 of the casing. The magnetized fragment 138 of the casing becomes itself a source of a substantial magnetic field outside the casing in the earth formations. To reverse the residual magnetization an electrical current of opposite direction to that of presented in FIG. 12A is applied to the coil 142 as shown in FIG. 12C. The magnetic flux shown at 158 and 164 has opposite direction to that of presented in FIG. 12A. It is also substantially zero outside the casing. When current is switched off the residual magnetization state opposite to the one in FIG. 12B is created (shown at 174). This completes the magnetic dipole reversal process resulting in generating magnetic field presented at 166. It should be understood from the explanation earlier above that the residual magnetization would depend on the length of the magnetized fragment 138 that approximately equal to the length of the coil 142. It should be also understood that magnetization delay due to electrical conductivity of the material of the casing will not prevent from energizing deep regions of the earth formations because time required for penetrating magnetic field deep into the formations substantially exceeds magnetization reversal time for the casing.

It will be readily appreciated by those skilled in the art that in order to perform induction transient measurements of the earth formations the transmitter antennas of present invention can be used with at least one receiver antenna described in prior art, for example in already sited U.S. Pat. No. 5,955,884 issued to Payton et al. A receiver antenna can be placed in the same well as the transmitter antenna at an axial distance from the transmitter antenna. It can also be placed in a different well in order to perform cross-well induction transient measurements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What I claim as my invention is:

1. An electromagnetic transient apparatus configured to generate a transient magnetic field in a material to be analyzed, comprising:
   a magnetic core having magnetic hysteresis and configured to generate the transient magnetic field when a pulsed current through a coil proximate to the magnetic core reverses a state of magnetization of the magnetic core, wherein the magnetic core is made of at least one permeable magnetic material, the at least one material and dimensions of the magnetic core being selected to make a residual magnetization of the core substantially equal to a saturation magnetization of the core and the at least one magnetic material having a substantially rectangular hysteresis loop when measured in a closed magnetic loop configuration; and
   an antenna configured to receive signals from the material to be analyzed, the signals caused by the reversal of the state of magnetization of the magnetic core.

2. The electromagnetic transient transmitter of claim 1 wherein the magnetic core includes at least one further magnetic property comprising a coercive force substantially equal to a ratio of the saturation magnetization and an effective susceptibility of the magnetic core.

3. The electromagnetic transient apparatus of claim 1 wherein the at least one permeable magnetic material has substantially rectangular hysteresis loop.

4. The electromagnetic transient apparatus of claim 2 wherein said at least one magnetic material has the coercive force in the range 1.5-8 kA/m.

5. The electromagnetic transient apparatus of claim 1 wherein the magnetic core is substantially non-conductive.

6. The electromagnetic transient apparatus of claim 1 wherein the at least one permeable magnetic material is selected from the group consisting of ferrite, crystalline magnetic metal ribbons or tapes, and amorphous magnetic ribbons or tapes.

7. The electromagnetic transient apparatus of claim 6, wherein said magnetic field in the material to be analyzed has a switching time, and wherein the crystalline magnetic metal ribbons or tapes and the amorphous magnetic ribbons or tapes have thickness selected in relation with said switching time.

8. The electromagnetic transient apparatus of claim 1 wherein said transient magnetic field in the material to be analyzed has a switching time, and the coil has inductance in relation with said switching time.

9. The electromagnetic transient apparatus of claim 1 wherein said material to be analyzed includes an earth formation surrounding a wellbore drilled therethrough, said wellbore having a longitudinal axis.

10. The electromagnetic transient apparatus of claim 9 wherein the coil is configured to generate a magnetic dipole having longitudinal axis direction selected from the group consisting of a direction parallel to the longitudinal axis of the wellbore and a direction perpendicular to the longitudinal axis of the wellbore.

11. The electromagnetic transient apparatus of claim 9 wherein the coil is configured to generate a magnetic dipole having longitudinal axis direction parallel to the longitudinal axis of the wellbore, further comprising at least one orthogonal coil configured to generate a magnetic dipole perpendicular to the longitudinal axis of the wellbore.

12. The electromagnetic transient apparatus of claim 11 wherein said magnetic core is made of an isotropic magnetic material.

13. The electromagnetic transient apparatus of claim 1 wherein said magnetic core comprises at least two parts having different magnetic properties.

14. The electromagnetic transient apparatus of claim 9 wherein said magnetic core is disposed between the coil and a conductive support or a drill collar and is configured to substantially shield the conductive support or the drill collar from a switchable magnetic field produced by the coil.

15. The electromagnetic transient apparatus of claim 14 wherein the coil has a dipole magnetic moment direction collinear with the wellbore longitudinal axis, further comprising at least one orthogonal coil having a dipole magnetic moment direction orthogonal to the wellbore longitudinal axis, the magnetic core having an external coaxial part and an internal coaxial part, the external part having a greater coercive force than the internal part.

16. The electromagnetic transient apparatus of claim 9 wherein the magnetic core is a fragment of a drill collar.

17. The electromagnetic transient apparatus of claim 1 wherein the material to be analyzed includes an earth formation between wellbores in order to perform a cross-well electro-magnetic imaging.

18. A method of analyzing an earth formation comprising:
   selecting at least one permeable magnetic material for a magnetic core, the at least one magnetic material having a coercive force and dimensions selected to make a residual magnetization of the core substantially equal to a saturation magnetization of the core and the at least one material having a substantially rectangular hysteresis loop when measured in a closed magnetic loop configuration;
   using the magnetic core which is made of the at least one permeable magnetic material and has magnetic hysteresis to produce a transient magnetic field in the earth formation when a pulsed current through at least one coil proximate the magnetic core reverses a state of magnetization of the magnetic core; and
   measuring an electromagnetic signal caused by eddy currents in the earth formation induced by the produced transient magnetic field.

19. The method of claim 18 further comprising using at least one orthogonal coil to facilitate magnetizing of said magnetic core in at least two orthogonal directions in order to assess anisotropy of electrical properties of the earth formation.

20. The method of claim 19 wherein the step of using the magnetic core comprises using of a magnetic core made of at least two different permeable magnetic materials.

21. The method of claim 18 wherein the step of using the magnetic core comprises steps selected from the group consisting of using an axial segment of a drill collar as the magnetic core when performing measurements while drilling and using an axial segment of a metal casing as the magnetic core when performing measurements in cased wells.

22. The method of claim 18 wherein using a magnetic core further comprises disposing the magnetic core between a conductive support or a drill collar and the at least one coil and substantially shielding the conductive support or drill collar from a switchable magnetic field produced by the at least one coil so as to substantially eliminate an effect of the conductive support or drill collar on measuring the electromagnetic signal, the magnetic core being selected from the group consisting of a single-material core and a bi-material core made of magnetic materials having different magnetic properties.

* * * * *